(12) United States Patent
Nishita et al.

(10) Patent No.: US 7,361,874 B2
(45) Date of Patent: Apr. 22, 2008

(54) AUTO FOCUSING MECHANISM OF SURVEYING INSTRUMENT

(75) Inventors: Nobuyuki Nishita, Kanagawa (JP); Naoki Shoji, Kanagawa (JP); Takashi Nagao, Kanagawa (JP)

(73) Assignee: Sokkia Co., Ltd., Kanagawa (JP)

( * ) Notice: Subject to any disclaimer, the term of this patent is extended or adjusted under 35 U.S.C. 154(b) by 34 days.

(21) Appl. No.: 11/319,204

(22) Filed: Dec. 28, 2005

(65) Prior Publication Data

US 2006/0192074 A1   Aug. 31, 2006

(30) Foreign Application Priority Data

Feb. 25, 2005   (JP) .............. 2005-050462

(51) Int. Cl.
*G02B 7/04*   (2006.01)
*G02B 27/40*   (2006.01)
*G02B 27/64*   (2006.01)

(52) U.S. Cl. .................... 250/201.2; 356/4.03
(58) Field of Classification Search ............. 250/201.2, 250/201.7; 356/4.03
See application file for complete search history.

(56) References Cited

U.S. PATENT DOCUMENTS

| | | | | |
|---|---|---|---|---|
| 5,738,104 A | * | 4/1998 | Lo et al. ................ | 600/521 |
| 5,742,378 A | * | 4/1998 | Kumagai et al. ........... | 356/4.08 |
| 6,108,920 A | * | 8/2000 | Kinoshita ................ | 33/293 |
| 6,960,749 B1 | * | 11/2005 | Nakamura ................ | 250/201.2 |
| 2006/0006308 A1 | * | 1/2006 | Konishi ................ | 250/201.2 |

FOREIGN PATENT DOCUMENTS

JP   2001-12949   1/2001

* cited by examiner

*Primary Examiner*—Georgia Epps
*Assistant Examiner*—Seung C Sohn
(74) *Attorney, Agent, or Firm*—Roberts, Mlotkowski & Hobbes; Thomas W. Cole

(57) ABSTRACT

An auto focusing mechanism is provided in a surveying instrument, such as an electronic level, that is capable of automatically focusing a telescope on a sighted staff.

As a focusing lens (21b) is moved by a motor (41) along the optical axis of a telescope (20), the image of a staff (1) sighted by the telescope (20) is converted into an electrical signal by a line sensor (24). The output signal of the line sensor (24) is converted into a digital signal by an A/D converter (27) and stored in a RAM (28). Based on the data stored in the RAM (28), a microcomputer (3) monitors frequencies of the component signals, or wavelets, contained in the output signal of the line sensor (24) stored in the RAM (28). When a particular frequency of the output signal associated with the position of the focusing lens (21b) is detected a determination is made that the focusing lens (21b) is located at a focusing position, and the distance from the telescope (20) to the staff (1) is calculated.

2 Claims, 11 Drawing Sheets

AUTO FOCUSING MECHANISM OF SURVEYING INSTRUMENT

FIELD OF THE INVENTION

This invention relates to an auto focusing mechanism built in a surveying instrument, such as an electronic level, capable of automatically focusing a telescope on a sighted staff.

BACKGROUND OF THE INVENTION

A typical auto focusing mechanism built in an electronic level has a device as shown in FIGS. 10 and 11. This auto focusing mechanism is equipped with a drive circuit 4 for controlling the motion of a stepping motor 41 for moving focusing lens 21b of a telescope (serving as a collimating optical system) along the optical axis thereof, the telescope having an objective lens 21a, an automatic collimation axis compensation mechanism 22, a beam splitter 23, a focusing plate 20a, and an eyepiece 20b, in addition to the focusing lens 21b. This auto focusing mechanism is also equipped with a line sensor 24 adapted to convert into an electric signal the image of a staff that is sighted by the telescope and captured through a beam splitter 23. The electric signal outputted from the line sensor 24 is amplified by an amplifier 25 and then converted into a digital signal by an analog-to-digital (A/D) converter 27. The digital signal is stored in a RAM 28 before it is sent to a microcomputer 3. The microcomputer 3 is adapted to:

obtain the pitch of multiple black marks (graduations marked at equal intervals on the white surface of the staff, forming a dark-and-bright pattern), based on the digital signal stored in the RAM 28;

obtain the distance from the telescope 20 to the staff based on the pitch obtained; and control the focusing lens 21b so as to bring the focusing lens 21b to the focusing position associated with the distance.

When a control signal is supplied from the drive circuit 4 to the stepping motor 41 under the control of the microcomputer 3, the stepping motor 41 moves and stops the focusing lens 21b until the focusing lens reaches the focusing position, that is, until the telescope 20 is automatically focused on the staff.

To do so, the focusing lens 21b is once moved to the far end of its movable range, adjacent to the eye piece 20b, where the telescope 20 is focused on an infinite point, for which the output signal of the line sensor 24 has a substantially flat waveform, as shown in FIG. 11 (*a*). Before the focusing lens 21b is moved away from the far end (where the telescope 20 is focused on an infinite point) towards the objective lens 21a, the microcomputer 3 sets a threshold level a below the peak level of the line sensor 24, and then moves the focusing lens 21b towards the objective lens 21a. In this step, the focusing lens 21b is stopped once when the output signal of the line sensor 24 exceeds the threshold α, and once when lowered below the threshold a to determine a range β in which the output signal assumes a level between the threshold level α and the peak level, as shown in FIG. 11(*b*). The position of the centerline CL of the range β is also determined. When two or more than two different ranges are observed, the positions of the respective centerlines CL and the average interval of the centerlines CL are determined. Since this average interval corresponds to the pitch of the imaged graduations of the staff 1 formed on the line sensor 24, the distance between the telescope 20 and the staff can be calculated based on the pitch. The telescope can be accurately focused on the staff by moving the focusing lens 21b to the focusing position as determined by the distance calculated. When the telescope 20 is automatically focused on the staff, the output signal of the line sensor 24 will have a waveform as shown in FIG. 11 (*c*).

In the conventional auto focusing mechanism, in order to automatically focus the telescope on the staff having thereon a pattern of equally spaced graduations, a decision is made that the focusing lens 21b is positioned at a substantial focusing position when the output level of the line sensor 24 has exceeded a given threshold level α, and the pitch of the graduations of the staff is computed from the output signal of the line sensor 24. However, under certain conditions of the staff, the status of the focusing lens being at a substantial focusing position cannot be correctly detected.

This happens because the staff is not always used in a uniformly illuminated environment, or because it may be used in a dark environment where the output level of the line sensor 24 cannot not exceed the threshold level a anywhere in the movable range of the focusing lens 21b. On the contrary, if an object brighter than the staff exists in the field of the telescope, the telescope can be focused on the brighter object, which causes the output level of the line sensor 24 to exceed the threshold level α, thereby resulting in an erroneous focusing of the telescope on the object other than the staff, which inevitably necessitates a time wasting redo of the survey.

It should be understood that the staff is not always entirely captured in the field of the telescope. For example, in cases where only an upper or lower portion of the staff is used in the survey, background objects other than the staff will result in signals that will mix into the output signal of the line sensor 24. Thus, in the event that the level of a background signal mixed in the output signal of the line sensor 24 exceeds the threshold level α, an erroneous determination of the focusing position, and hence of erroneous distance, will result if focusing position determination is made under such condition.

In other words, in processing the output signal of the line sensor 24, if the pitch of the pattern on the staff is calculated based on erroneous data or low-level output signals, a problem will arise in that an incorrect or inaccurate distance results.

Then, auto focusing of the telescope 20 on the staff will fail, thereby entailing a long survey time and lowering the working efficiency of the survey, or lose its accuracy, thereby influencing badly on the survey.

In view of these drawbacks pertinent to prior art auto focusing mechanisms, the invention is directed to an improvement in auto focusing mechanism in which the status of the focusing lens being located at a focusing position can be correctly and quickly detected.

SUMMARY OF THE INVENTION

To attain the above object of the invention, there is provided an auto focusing mechanism, as claimed in claim 1, for use with a surveying instrument equipped with a telescope having a collimating optical system that includes, between an objective lens and an eyepiece thereof, a focusing plate and a focusing lens for forming on the focusing plate an image of a staff serving as a (targeted) collimating object, the staff having thereon multiple pattern marked at equal intervals, the auto focusing mechanism adapted to automatically focus the telescope on the staff, the auto focusing mechanism comprising:

drive means for moving the focusing lens in the direction of the optical axis of the collimating optical system;

position detection means for detecting the position of the focusing lens in the collimating optical system;

photoelectric conversion means for converting into an electric signal the image of an object formed on the focusing plate;

frequency detection means for detecting the frequencies of the electric signal outputted from the photoelectric conversion means;

distance calculation means for calculating the distance from the telescope to the staff based on the output signal received from the photoelectric conversion means, the distance calculation means adapted to monitor the position of the focusing lens detected by the position detection means and the frequencies detected by the frequency detection means to thereby determine the distance when a particular frequency for a focusing position is detected by the frequency detection means during a process of varying the position of the focusing lens; and drive control means for controlling the drive means to position the focusing lens at a focusing position based on the distance calculated by the distance calculation means and the position detected by the position detection means.

Function

As the focusing lens is moved by the drive means in the direction of the optical axis of the collimating optical system, the position of the focusing lens is detected by the position detection means, and an image of the object that corresponds to the image formed on the focusing plate is formed on the photoelectric conversion means, which is converted into an electric signal by the photoelectric conversion means. When a particular frequency of the electric signal defined for a given focusing position of the focusing lens is detected by the frequency detection means in the process of varying the position of the focusing lens, the focusing lens is recognized as being located at the focusing position, which enables the distance calculation means to calculate the distance between the telescope and the staff based on the signal outputted from the photoelectric conversion means, as described in detail below. Thus, it is possible to correctly and quickly detect the status of the focusing lens being located at a focusing position.

That is, with the telescope focused on the staff having multiple graduations spaced apart at equal intervals on the staff, an image of the graduations is formed on the focusing plate in the form of a dark-and-bright pattern, which pattern is captured by the photoelectric conversion means and converted into an electric signal indicative of the dark-and-bright pattern. The level of the electric signal varies with the darkness and brightness of the dark-and-bright pattern of the image, and the frequency of the signal varies with the focusing position of the focusing lens. Further, the frequency of the electric signal to be detected from the dark-and-bright pattern of the staff, with the focusing lens located at the focusing position, can be preliminarily obtained from a known relationship between the focusing position of the focusing lens and the distance from the telescope to the staff. Hence, it is possible to make a decision, by monitoring the position of the focusing lens and the frequency of the signal that the focusing lens is located at a specific focusing position associated with a particular frequency of the signal when the particular frequency is detected in the process of moving the focusing lens. Since the frequency of the electric signal can be accurately detected even when the staff is placed in a non-uniformly illuminated environment, or even when only an upper or lower part of the staff can be seen by the telescope, it is possible to make a quick yet correct detection of the status of the focusing lens being at a substantial focusing position.

After the distance from the telescope to the staff is determined based on the substantial focusing position, repositioning of the focusing lens to the accurate focusing position can be done by controlling the drive means based on the known relationship between the distance and the focusing position of the focusing lens, thereby executing auto focusing of the telescope on the staff. This positioning of the focusing lens can be attained by controlling the drive means to stop the focusing lens at the focusing position. For example, the drive means can be controlled to stop the focusing lens when the difference between the focusing position calculated by the distance calculation means and the position of the focusing lens detected by the position detection means has become 0.

As claimed in claim 2, in the auto focusing mechanism of a surveying instrument according to claim 1, the frequency detection means may be adapted to extract, from the electric signal outputted from the photoelectric conversion means, only a particular frequency component that is presumably detectable for the dark-and-bright pattern of the staff when the focusing lens is positioned at the focusing position.

Function

In the frequency detection means, a band pass filter can be used to extract a particular frequency component that is presumably detectable for the pattern on the staff with the focusing lens positioned at a focusing position. Thus, only those frequency components arising from the dark-and-bright pattern of the staff can be detected more accurately for particular focusing positions even when the staff is placed in a non-uniformly illuminated environment and noise arising from objects other than the staff is superposed on the output signal of the photoelectric conversion means. Hence, a more accurate decision that the focusing lens is located at the focusing position can be made.

As claimed in claim 3, in the auto focusing mechanism for use with a surveying instrument as defined in claim 2, the distance calculation means may include:

moving average processing means for calculating the absolute values of pulse heights of the particular frequency components extracted by the frequency detection means, and performing moving average processing on the absolute values of pulses in a given preset staff sectional area;

decision means for making a decision as to whether the maximum value of the moving average exceeds a given threshold level or not;

staff area setting means for setting a staff sectional area in association with the output signal of the photoelectric conversion means when an affirmative decision is obtained in the decision such that the staff sectional area has the same width as a region of photoelectric transducers centered at the transducer giving the maximum value; and calculation means for calculating the distance from the telescope to the staff based on the period of the output signal of the photoelectric conversion means in the staff sectional area by Function By calculating the absolute values of the pulse heights of particular frequency components obtained by band pass filtering, and by performing moving average processing on the absolute values, only those component signals having continuity can be extracted. In this processing, if a component signal (wavelet) that arises from the dark-and-bright pattern of the staff has continuity, its level obtained in the moving average processing will be high. On the other hand, if a component signal (wavelet) arises from objects other than the staff (e.g. background objects), it has less continuity and a low moving average. When the maximum value (level) of the moving average exceeds a given threshold level, the focusing lens is regarded as being positioned at a substantial focusing position, and a staff section area is set in the output signal of the photoelectric conversion means in such a way that the staff sectional area has the same width as a region of photoelectric transducers centered at the transducer giving the maximum value. Regarding the period of cycle (peak-to-peak distance) of the electric signal within the staff sectional area as the pitch of the dark-and-bright pattern of the staff, the distance from the telescope to the staff can be calculated from the pitch. Thus, the distance can be calculated with a higher precision using only the brightest component signal.

As claimed in claim 4, in the auto focusing mechanism for use with a surveying instrument according to claim 2, the photoelectric conversion means may include multiple photoelectric transducers, and the distance calculation means may include:

moving average processing means for calculating the absolute values of pulse heights of the particular frequency components extracted by the frequency detection means, and performing moving average processing on the absolute values of the pulse heights in a given preset staff sectional area;

light intensity correction coefficient calculation means for calculating a light intensity correction coefficient based on the difference between the maximum value of the signal indicative of the maximum light intensity within the staff sectional areas used in the moving average processing and the maximum light intensity obtained from the output signals of the multiple photoelectric transducers; within the staff light intensity correction coefficient multiplication means for multiplying the moving average obtained by the light intensity correction coefficient calculation means;

decision means for making a decision whether the maximum value of the products obtained by the light intensity correction coefficient multiplication means exceeds a given threshold or not;

staff area setting means for setting a staff sectional area in the output signal of the photoelectric conversion means when an affirmative decision is obtained in the decision, the staff sectional area having the same width as a region of photoelectric transducers centered at the transducer giving the maximum value; and calculation means for calculating the distance from the telescope to the staff based on the period of the output signal of the photoelectric conversion means in the staff sectional area by regarding the period of cycle as the pitch of the pattern of the staff.

Function

By calculating the absolute values of pulse heights of particular frequency components extracted by the frequency detection means and performing moving average processing on the absolute values, only those component signals having continuity can be extracted. In this processing, if a component signal arises from the dark-and-bright pattern on the staff having continuity, the component signal has a large (high) moving average. If, on the contrary, a component signal arises from, for example, background objects other than the staff, and has less continuity, component signal has a small (low) moving average. On the other hand, when a background object brighter than the staff captured by the telescope generates a signal having sufficient continuity, the level of this signal will be higher than that of the signal arising from the staff pattern, so that the image of the staff cannot be extracted unless some measures are taken to overcome this problem. Therefore, taking account of possibility that a background object brighter than the staff can be captured, light intensity correction coefficient multiplication processing is performed following the moving average processing. Specifically, absolute values of pulse heights of particular frequency components extracted by the frequency detection means are calculated, and then moving average processing is performed on the absolute values in a preset staff sectional area. Further, a light intensity correction coefficient is calculated on the basis of the difference between the maximum light intensity obtained from the maximum absolute value within the staff sectional areas used in the moving average processing means and the maximum light intensity obtained from the signals outputted from the multiple photoelectric transducers. Based on this calculation, a light intensity correction coefficient is calculated that "corrects" the levels of the output signals of the respective photoelectric transducers to the level that corresponds to the maximum light intensity. For example, if the level of the electric signal (output signal of the photoelectric transducer) capturing the pattern of the staff is ½ the maximum light intensity, the light intensity correction coefficient is set to 2; and if the level of the electric signal arising from a background object is about the maximum light intensity, the light intensity correction coefficient is set to 1. After the light intensity correction coefficient is obtained, the light intensity correction coefficient and the moving average obtained by the moving average processing are multiplied together. As a consequence, the moving average of the electric signal arising from the pattern of the staff is multiplied by 2, while the moving average of the electric signal arising from the background object is multiplied by 1, resulting in a larger level for the signal associated with the staff pattern than for the signal associated with the background object. Subsequently, if the maximum level of the signal arising from the staff pattern corrected by the light intensity correction coefficient exceeds the threshold level, the focusing lens will be correctly recognized as positioned at a substantial focusing position, and a staff sectional area will be set in the output signal of the photoelectric conversion means in such a way that the staff sectional area have the same width as a region of photoelectric transducers centered at the transducer giving the maximum value. Regarding the period of cycle (peak-to-peak distance) of the electric signal within the staff sectional area as the pitch of the dark-and-bright pattern of the staff, the distance from the telescope to the staff can be calculated from the pitch. Thus, the distance can be calculated with a higher precision. As a result, the status of the focusing lens being located at a substantial focusing position can be quickly and accurately detected even when an object brighter than the staff is captured in the image of the background.

As will be clear from the description above, an inventive auto focusing mechanism according to claim 1 can quickly and correctly detect the focusing lens located at the focusing position.

The auto focusing mechanism according to claim 2 can detect the focusing lens located at the focusing position more accurately.

The auto focusing mechanism according to claim 3 can distinguish a background object from the staff of interest, and determine the distance from the telescope to the staff with a higher precision.

The auto focusing mechanism according to claim 4 can detect the focusing lens located at a substantial focusing position more quickly and accurately even when an object brighter than the staff exists in the background.

DETAILED DESCRIPTION OF THE PREFERRED EMBODIMENT

Figure 1:
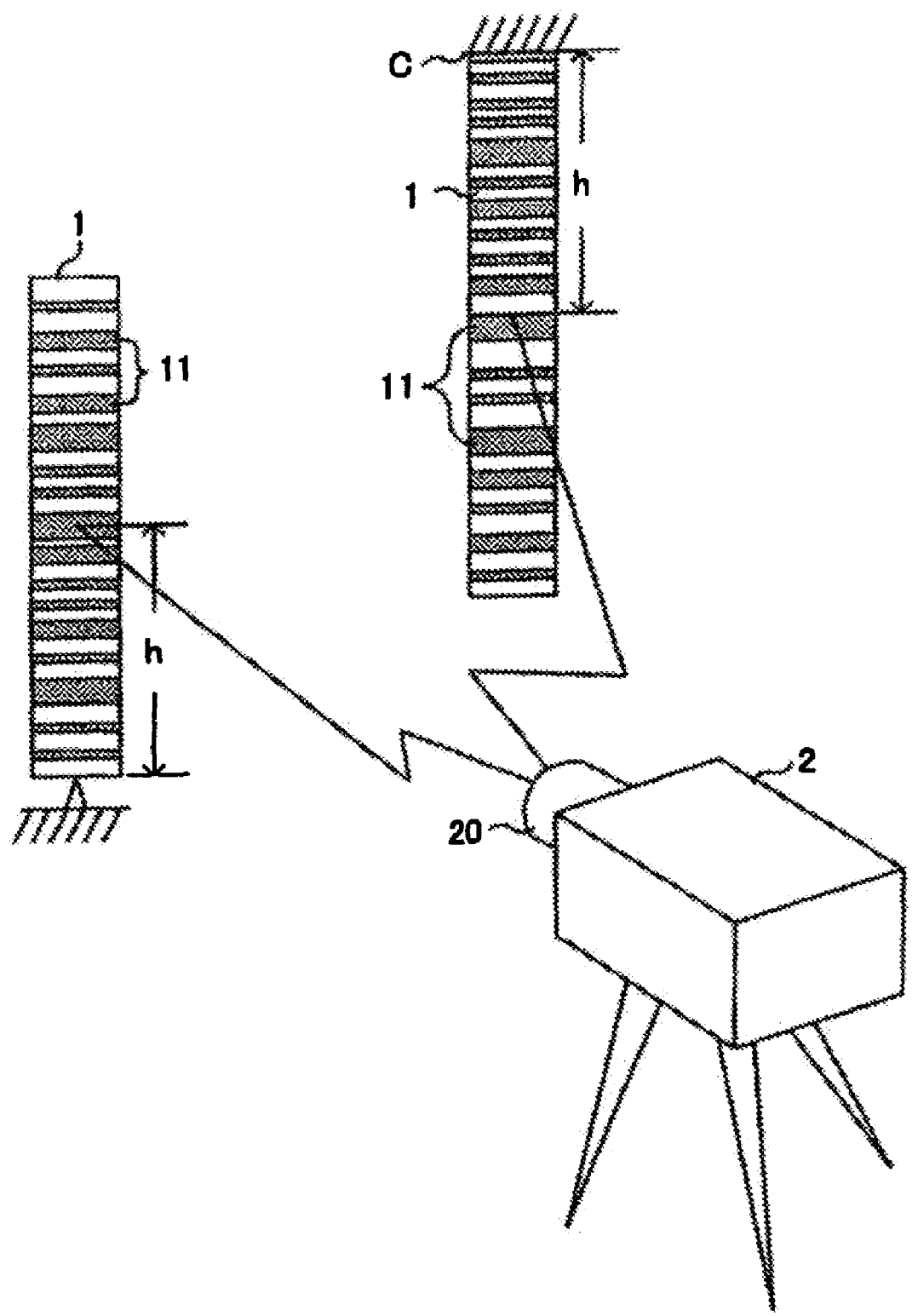
FIG. 1 is a perspective view illustrating a relationship between an inventive electronic level and a staff.
Figure 2:
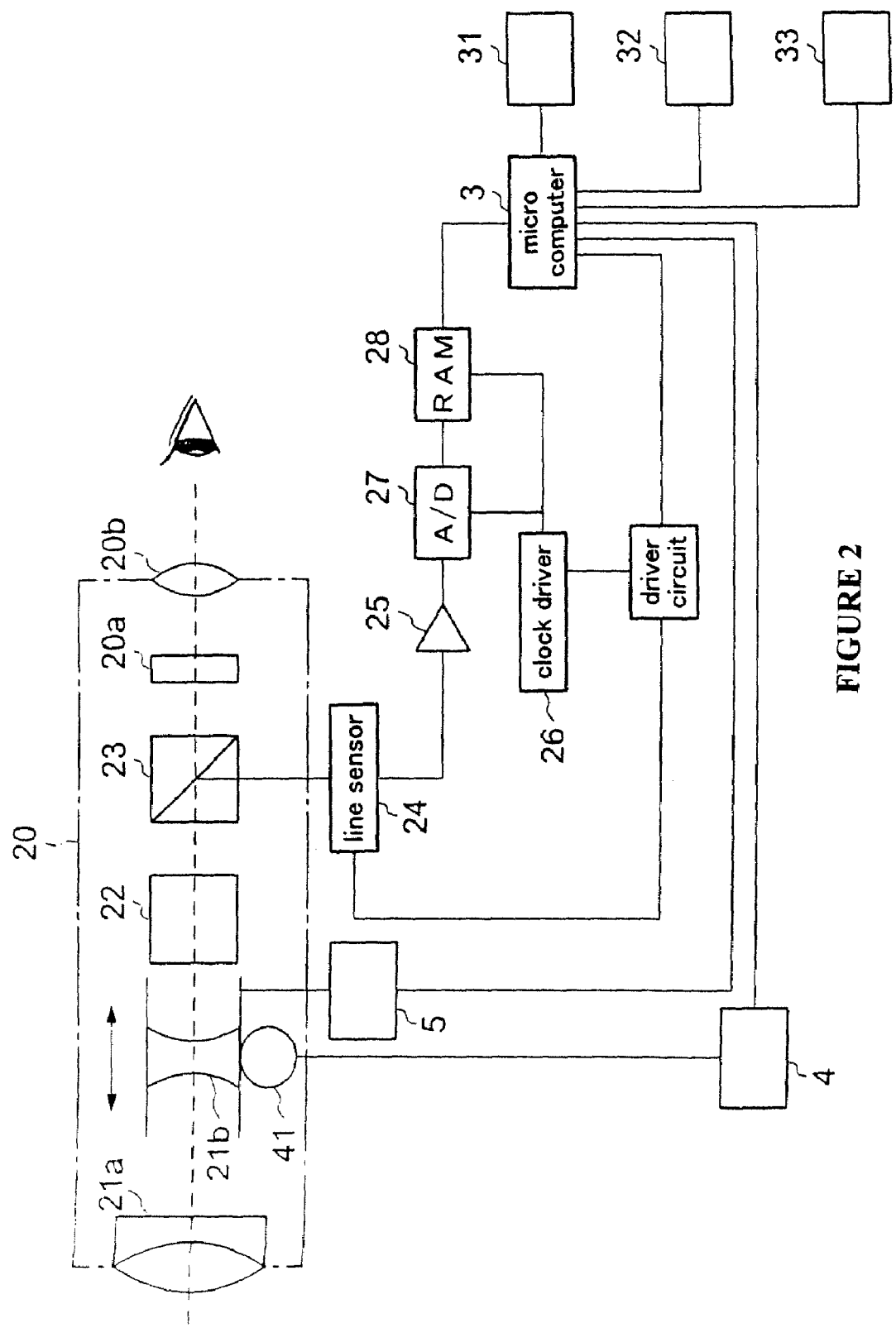
FIG. 2 is a block diagram of an auto focusing mechanism according to a first embodiment of the invention for use with a surveying instrument.

The invention will now be described in detail by way of example with reference to the accompanying drawings. FIG. 1 shows in a perspective view a relationship between a staff and an electronic level 2 according to the invention. FIG. 2 is a block diagram representation of an inventive auto focusing mechanism for use with a surveying instrument.

The electronic level 2 shown in the figures is constructed to serve as a surveying instrument for measuring the height h of a position of a staff 1 collimated or sighted by the telescope 20. The staff 1 is provided on the white surface thereof with multiple black marks or graduations 11 spaced apart at equal intervals in the vertical (i.e., longitudinal) direction of the rod. The widths of the marks 11 are not all the same in the vertical direction. The staff 1 includes multiple kinds of marks having different widths in a predetermined order. That is, the staff 1 is provided with a bar code pattern consisting of multiple kinds of marks 11 spaced apart at equal intervals The staff 1 is normally set upright, but it may be set upside down to abut against, for example, a reference ceiling C. In the latter case, the electronic level 2 will measure the distance h from the ceiling C to the sighted point. This distance h will be also referred to as "height", as in the normal case. The staff 1 is also provided on the backside thereof with the same bar code pattern (not shown) as the front pattern for use for the same purpose.

The bar code pattern can be read correctly by software, irrespective of the direction of the bar code, so that workers need not worry about the direction of the top end of the rod.

The telescope 20 serving as a collimating optical system has an objective lens 21a, a focusing lens 21b, an automatic compensation mechanism (compensator) 22, a beam splitter 23, a focusing plate 20a, and an eyepiece 20b, in such a way that the focusing lens 21b, automatic compensation mechanism 22, beam splitter 23, and focusing plate 20a are aligned to the common optical axis of the objective lens 21a and eyepiece 20b, as shown in FIG. 2. The automatic compensation mechanism 22 is designed to automatically compensate for an inclination (relative to a horizontal plane) of the collimating axis of the electronic level. When the telescope 20 is focused on an object such as the staff 1, the light emitted from the object is transmitted through the objective lens 21a, focusing lens 21b, inclination automatic compensation mechanism 22, and beam splitter 23 to form an image of the object on the focusing plate 20a. The focusing lens 21b is provided to control the focusing condition of the image formed (to be well focused or poorly focused) on the focusing plate 20a, according to the distance between the telescope and the staff 1. Thus, it can be freely moved over a distance along the optical axis of the collimating optical system. In order to move the focusing lens 21b along the optical axis of the collimating optical system, the focusing lens 21b is operably connected to a motor 41 via, for example, a mechanism such as a rack-and-pinion unit (not shown). The motor 41 serving as a drive means is adapted to move the focusing lens 21b along the optical axis of the collimating optical system in response to a pulse signal received from a drive circuit 4. The drive circuit 4 generates and outputs a pulse signal to the motor 41, as instructed by a microcomputer 3.

The rotational position of the motor 41 of the collimating optical system can be detected by a position sensor 5. The position sensor 5, serving as a position detection means for detecting the position of the focusing lens 21b in the collimating optical system, consists of, for example, an optical sensor (linear encoder), a magnetic sensor, or a sensor for detecting the angle of rotation of the motor. The output of the position sensor 5 is inputted into the microcomputer 3.

There is provided near the telescope 20 a line sensor 24 arranged at a position conjugate to the focusing plate 20a. The line sensor 24, together with the objective lens 21a, focusing lens 21b, automatic compensation mechanism 22, and beam splitter 23, constitutes an imaging optical system. The line sensor 24 converts the dark-and-bright image (that corresponds to the image formed on the focusing plate 20a, referred to as secondary image) formed on the light receiving face thereof by the light coming from the beam splitter 23 into an electric signal having a varying intensity in accord with the darkness and brightness of the image on the light receiving face. In order to output an electric signal that can represent any of the patterns marked on the staff 1 when it is placed at infinite point and observed by the telescope 20 in focus, the line sensor 24 has a sufficient number, for example 2048, of picture elements in the form of CCDs (charge coupled devices), one for each of 2048 pixels. The electric signal outputted from the line sensor 24 is amplified by an amplifier 25 before it is inputted into an A/D (analog-to-digital) converter 27. The A/D converter 27 samples and holds the inputted analog signal in synchronism with the clock provided by a clock driver 26, and then converts the sampled analog signal into a digital signal. The digital signal obtained by the A/D converter 27 is sequentially stored at allocated memory locations of the RAM 28, which signal is subsequently transferred to the microcomputer 3.

The microcomputer (or CPU) 3 has a function to implement frequency detection means for detecting the frequency of the output signal of the line sensor 24, based on the data stored in the RAM 28. The microcomputer 3 monitors the frequency of the output signal of the line sensor 24 and the position of the focusing lens 21b based on the output of the position sensor 5. The microcomputer 3 also has a function to implement distance calculation means for calculating the distance from the telescope 20 to the staff 1 based on an electric signal obtained by the line sensor 24 when a particular frequency of the electric signal defined for a focusing position of the focusing lens 21b is detected during the process of moving the focusing lens 21b, that is, when the focusing lens 21b is found at a substantial focusing position.

The microcomputer 3 may has a further function to implement drive control means for controlling the motor 41 to position the focusing lens 21b based on the distance calculated by the distance calculation means and on the output of the position sensor 5. Controlled positioning of the focusing lens 21b can be carried out by defining the stopping position of the focusing lens to be the focusing position. For example, the drive means may be controlled to stop the motor 41 driving the focusing lens 21b when the difference between the focusing position of the focusing lens 21b and the detected position of the lens obtained by the position sensor 5 becomes zero (null).

Figure 3:
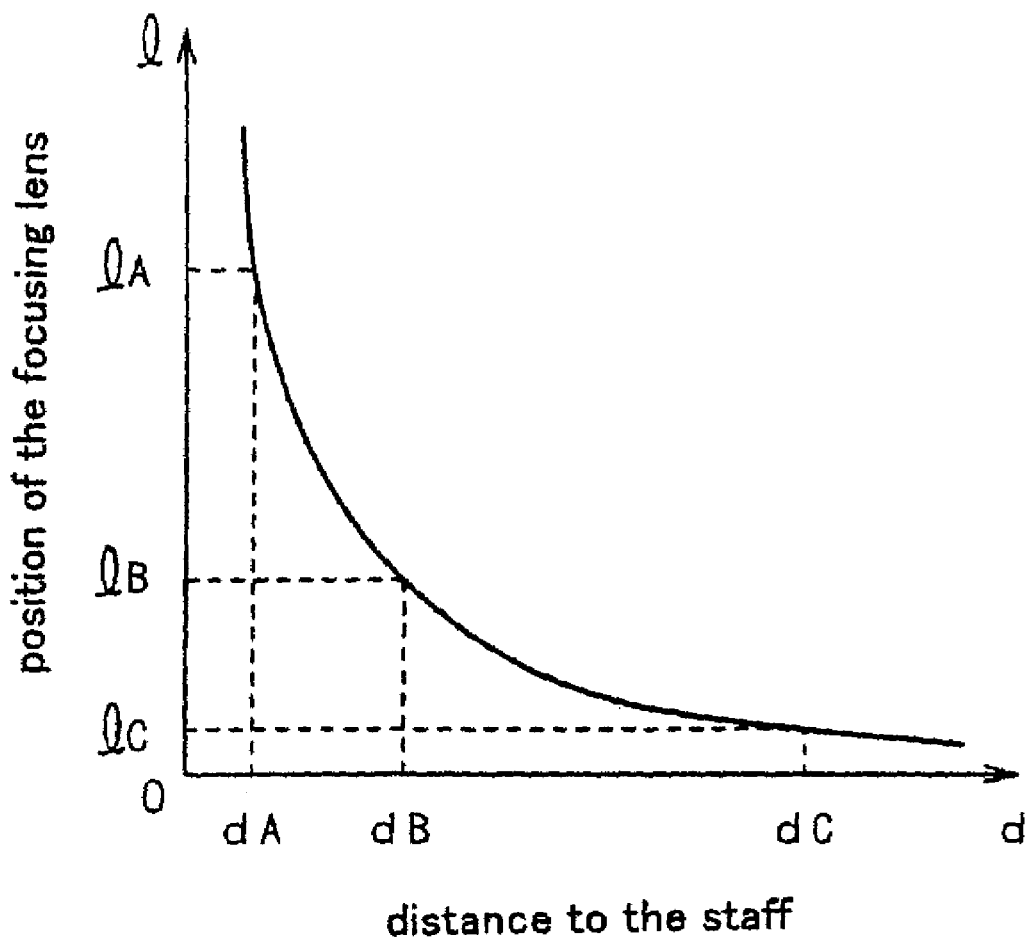
FIG. 3 is a graph showing a characteristic relationship between the distance from the telescope of the surveying instrument to the staff and the position of the focusing lens thereof with the focusing lens positioned at its focusing position.

A ROM 31 stores a formula defining a relationship between the position (1) of the focusing lens 21b of the collimating optical system in focus and the distance (d) from the telescope 20 to the staff 1, as shown in FIG. 3.

The electric signal outputted from the line sensor 24 is provided in the form of an alternating signal (indicative of luminance) that represents the bright-and-dark pattern of the staff 1. Its frequency varies with the position of the focusing lens 21b. The frequency of the alternating signal is low when the staff 1 is in focus near the telescope 20, and becomes higher when the staff 1 is in focus at a large distance from the telescope 20. Thus, a relationship between the frequency of the output signal of the line sensor 24 and the distance from the telescope 20 to the staff 1 in focus can be preliminarily formulated.

Thus, in the embodiment shown herein, the ROM 31 stores a formula that describes the relationship between the focusing position of the focusing lens 21b and the frequency anticipated for a given pattern of the staff 1 in focus.

Additionally, in order to make a decision as to whether the focusing lens 21b is located at a focusing position, the microcomputer 3 is adapted to:

(1) monitor the frequency of the electric signal outputted from the line sensor 24 to make a decision that the focusing lens 21b is located at a substantial focusing position, based on the characteristics tables and data stored in the ROM 31;

(2) monitor the position of the focusing lens 21b based on the output of the position sensor 5 during a process of varying position of the focusing lens 21b;

(3) determine, upon detection of a particular frequency defined for a focusing position of the focusing lens 21b during the process of moving the focusing lens 21b, that the focusing lens 21b is located at a substantial focusing position; and (4) calculate the distance from the telescope to the staff 1 based on the output signal of the line sensor 24.

Following a affirmative decision is obtained that the focusing lens 21b is positioned at the substantial focusing position, the microcomputer 3 controls the motor 41 to re-position the focusing lens 21b based on the calculated distance between the telescope 20 and the staff 1 and the position of the focusing lens 21b detected by the position sensor 5.

In other words, the microcomputer 3 has a positioning control function implementing drive control means for controlling the motor 41 such that the focusing lens 21b is stopped when the difference between the focusing position of the focusing lens 21b determined by the distance from the staff 1 to the telescope 20 and the position of the focusing lens 21b detected by the position sensor 5 has become zero.

Results of the calculations performed by the microcomputer 3 are displayed on a display 32.

Figure 4:
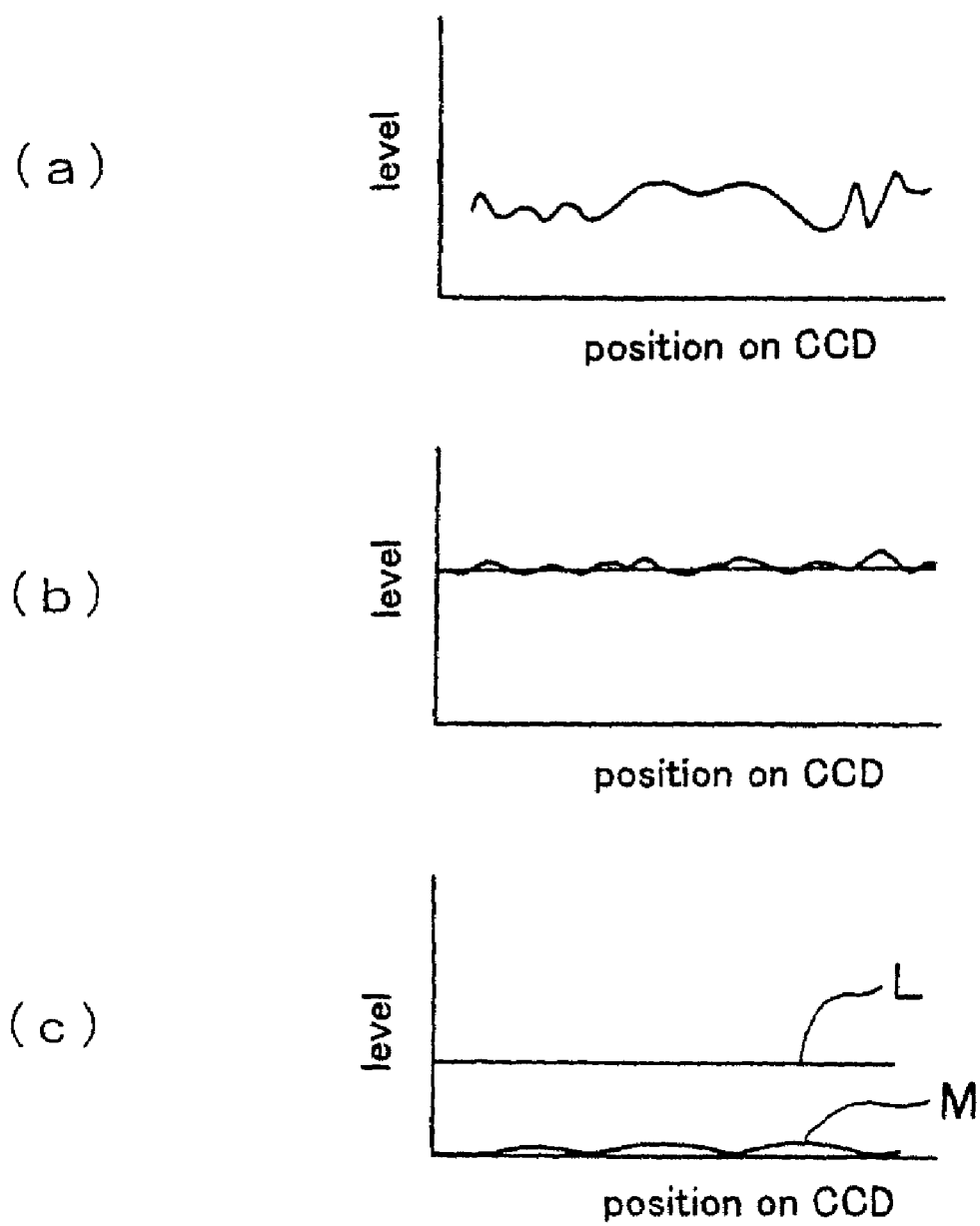
FIG. 4 shows waveforms useful in illustrating operation of the inventive auto focusing mechanism when the focusing lens is offset from the focusing position.

Next, referring to FIGS. 4 and 5, details of the operation of the auto focusing mechanism will now be described.

First, operation of Auto focusing Button 33 causes the microcomputer 3 to start auto focusing by providing the drive circuit 4 with an instruction to output a sequential pulse signal to the motor 41. In response to the pulse signal, the motor 41 starts its rotational motion to move the focusing lens 21b all the way down to the farthest end of its movable region, adjacent to the eyepiece 20b. Under this condition, the telescope 20 will be focused on an infinite point. Hence, unless the staff 1 is located at the infinite point, the line sensor 24 will generate a trivial signal, which is virtually flat in waveform as shown in FIG. 4 (a) and has little feature to distinguish the staff 1. If, using the microcomputer 3, the output signal of the line sensor 24 is filtered with a band pass filter for extracting a particular frequency component, no frequency component will be extracted as shown in FIG. 4 (b). Under this condition, if band pass filtering were performed on the output signal using the microcomputer 3 to extract those frequency components that would be detectable for the pattern of the staff 1 placed at an infinite point, the maximum level of the resultant signal would not exceed the threshold level L, as shown in FIG. 4 (c), since in actuality the staff is not at the infinite point. Hence, the focusing lens 21b will be determined to be offset from the focusing position, and the focusing lens 21b will be moved towards the objective lens 21a at a predetermined speed.

In the process of moving the focusing lens 21b towards the objective lens 21a, band pass filtering is performed on the output signal with the filtering frequency varied in accordance with the position of the focusing lens 21b. The output level of the output signal of the line sensor 24 is monitored by the microcomputer 3. At some point during the movement of the focusing lens 21b, bright-and-dark patterns associated with the bright-and-dark pattern of the staff 1 appear on the photoelectric transducers (pixels), which turns out to be oscillatory output signal of the line sensor 24 involving localized waves or wavelets such as signals S1, S2, and S3 as shown in FIG. 5 (a) The microcomputer 3 then performs band pass filtering to extract a particular frequency component relevant to the position of the focusing lens 21b. This filtering yields only those signals, such as S11 and S31 as shown in FIG. 5(b), that arises from the equally spaced pattern of the staff 1. That is, signals S1 and S3 presumably contain an identical frequency component that arises from the bright-and-dark pattern of the staff 1, which yields signals S11 and S31 through band pass filtering. On the other hand, the signal S2 belongs to a different frequency component than components S1 and S3, so that it is regarded as arising from the background and excluded by the band pass filtering.

On the other hand, in the event that more than one anticipated signal are extracted from the line sensor 24 in association with the captured pattern of the staff 1 even after the band pass filtering, the distance from the telescope 20 to the staff 1 cannot be accurately calculated solely based on these signals.

In the embodiment shown herein, therefore, in order to compute the distance with a high precision, absolute values of the pulse heights of the particular frequency components obtained by the band pass filtering are calculated in order to perform moving average processing on the absolute values. In the moving average processing, a wavelet (component signal) having periodic continuity (or periodic peaks) exhibits a high level.

For example, when the absolute values are computed for the signals S1 and S31 obtained through band pass filtering, and moving average processing is performed using a preset staff sectional area A that corresponds to, for example, 70 graduations of the staff 1, one obtains waveforms of the signal S12 and S32, as shown in FIG. 5(c). In this instance, the signal S11 has significant continuity that the level of the signal S12 is high. On the other hand, the level of the signal S32 is low, since the signal S31 has less continuity. Next, a decision is made as to whether the maximum value of the signal thus obtained in the moving average processing exceeds the threshold level L or not. In this instance, since the maximum value M1 exceeds the threshold level L, it is determined that the focusing lens 21b is positioned at a substantial focusing position. The signal S1 is regarded as capturing the staff 1 on the ground that the position of the photoelectric transducer exhibiting the maximum value M1 belongs to the signal S1, and a staff sectional area A is set in the output signal of the line sensor 24 such that the area A has the same width as a pixel region centered at the pixel giving the maximum level M1, as shown in FIG. 5(d).

Figure 5:
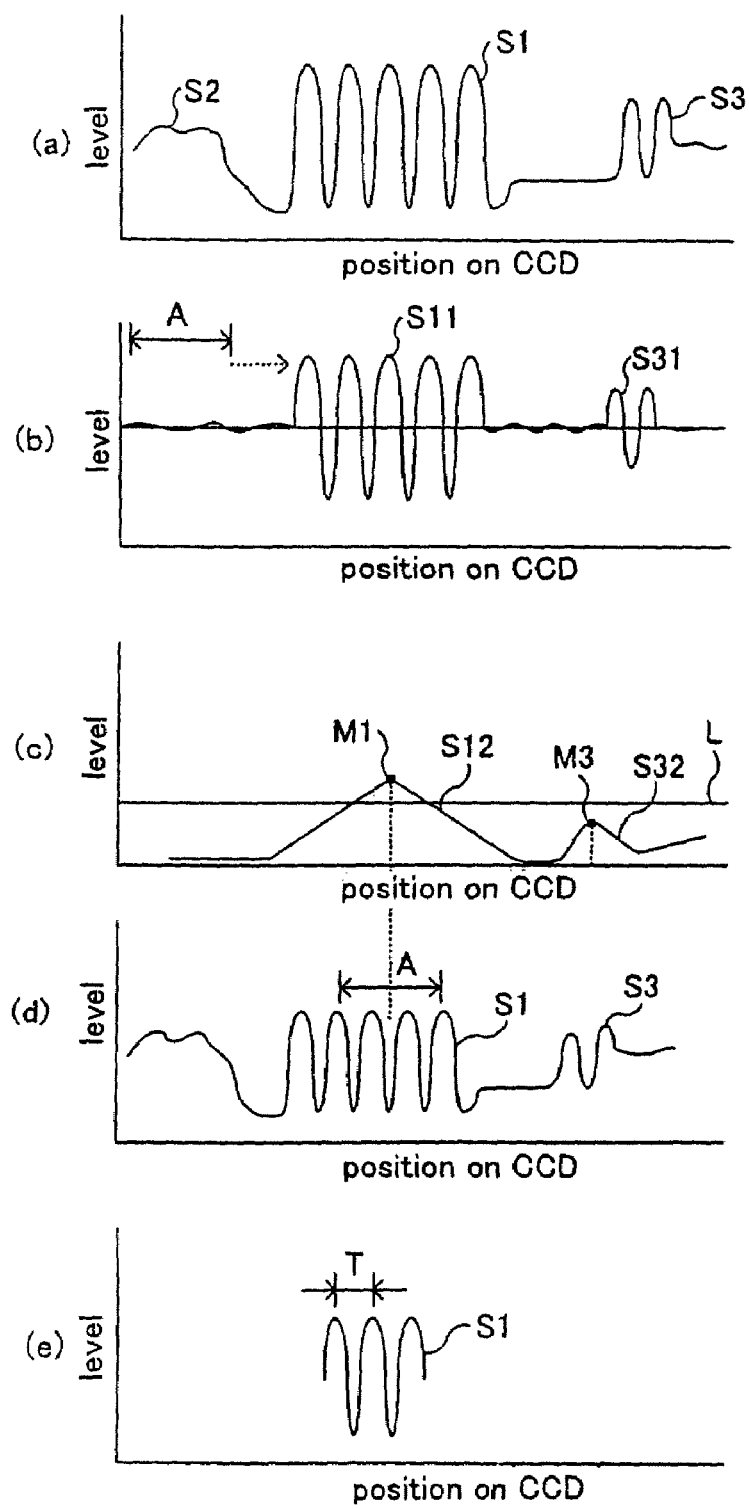
FIG. 5 shows waveforms useful in illustrating operation of the inventive auto focusing mechanism when the focusing lens is located at a substantial focusing position.

Next, the distance from the telescope 20 to the staff 1 is calculated from the period of cycle T (peak-to-peak distance) of the component signal (signal S1) within the staff sectional area A, as shown in FIG. 5 (e), on the ground that the period T corresponds to the pitch of the pattern of the staff 1. The focusing lens 21b can be accurately positioned at the focusing position by moving it to the focusing position determined by the distance thus calculated.

In this case, in addition to the above-described functions implementing the distance calculating means and frequency detection means, the microcomputer 3 has further functions implementing:

means for calculating the absolute values of the pulse heights of particular frequency components extracted by the frequency detection means and for performing moving average processing on the calculated absolute values using a preset staff sectional area A;

decision means for making a decision as to whether the result of the moving average processing exceeds a given threshold or not;

means for setting a staff sectional area in the output signal of the line sensor 24 such that the staff sectional area has the same width as a pixel region centered at the pixel giving the maximum value, provided that an affirmative decision is obtained in the decision means; and calculation means for calculating the distance from the telescope 20 to the staff 1 on the recognition that the period of cycle T of the output signal of the line sensor 24 within the staff sectional area corresponds to the pitch of the pattern of the staff 1.

In the embodiment shown herein, in order to enable quicker and more accurate detection of the focusing lens 21b being at the substantial focusing position, the invention employs:

(a) band pass filtering performed on the electric signal outputted from the line sensor 24 to extract a particular frequency component;

(b) moving average processing performed on the averages calculated for the frequency component to obtain a relevant waveform; and (c) a decision that the focusing lens 21b is positioned at a substantial focusing position on the premise that the maximum value of the waveform (i.e. result of the moving average processing obtained by the moving average processing means) exceeds a given threshold level, Moreover, after the decision is made that the focusing lens 21b is located at a substantial focusing position, the distance can be accurately determined and the focusing lens 21b can be accurately repositioned at the targeted focusing position, since the distance from the telescope 20 to the staff 1 can be calculated with a high precision based on the period of cycle T of the component signal (signal S1) within the staff sectional area associated with the pitch of the equally spaced pattern of the staff 1.

Figure 6:
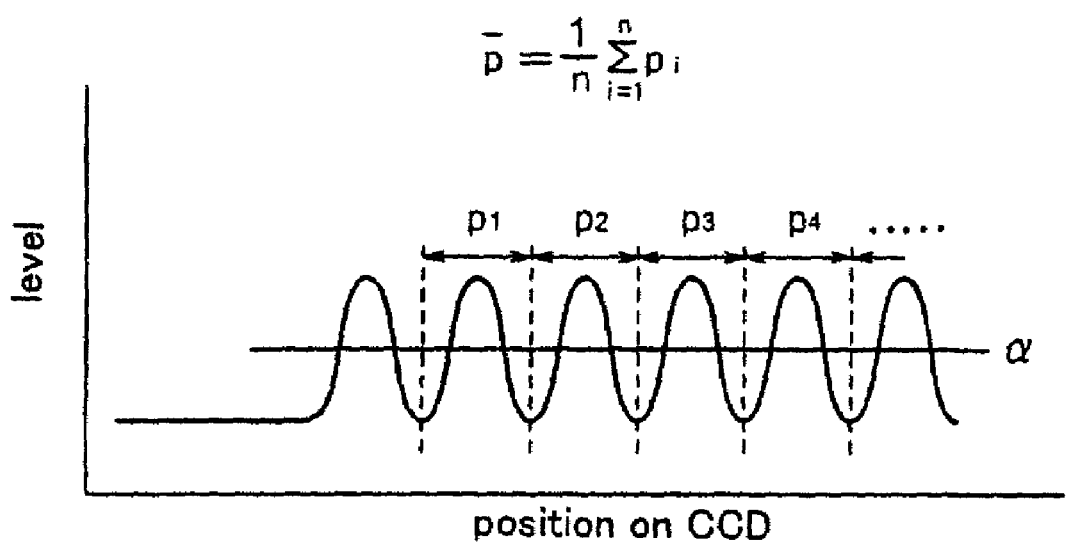
FIG. 6 shows a waveform illustrating how the pitch of equally spaced graduations is detected from the period of an electric signal.

Further, to obtain the pitch of the equally spaced pattern, an alternative method can be used in which, given a predetermined threshold level α, distances p1, p2, p3, p4, etc. between the neighboring centers of the peaks of a component signal exceeding the threshold level and then the mean value of the distances p is calculated, as shown in FIG. 6.

After the focusing lens 21b is positioned at the focusing position, the height h of the sighted position can be determined using a procedure as taught in, for example, the publication of unexamined Japanese Patent Application No. H11-183164.

In the foregoing embodiment, it is assumed that the staff 1 is brighter than its background objects. In some cases, however, a background object captured in the telescope is brighter than the staff 1. In that case, the relative light brightness of the staff lowers, possibly to a level much too low to extract the image of the staff. Therefore, in view of the fact that an object brighter than the staff 1 can exist in the background, the invention performs light intensity correction coefficient multiplication processing following the moving average processing.

Figure 7:
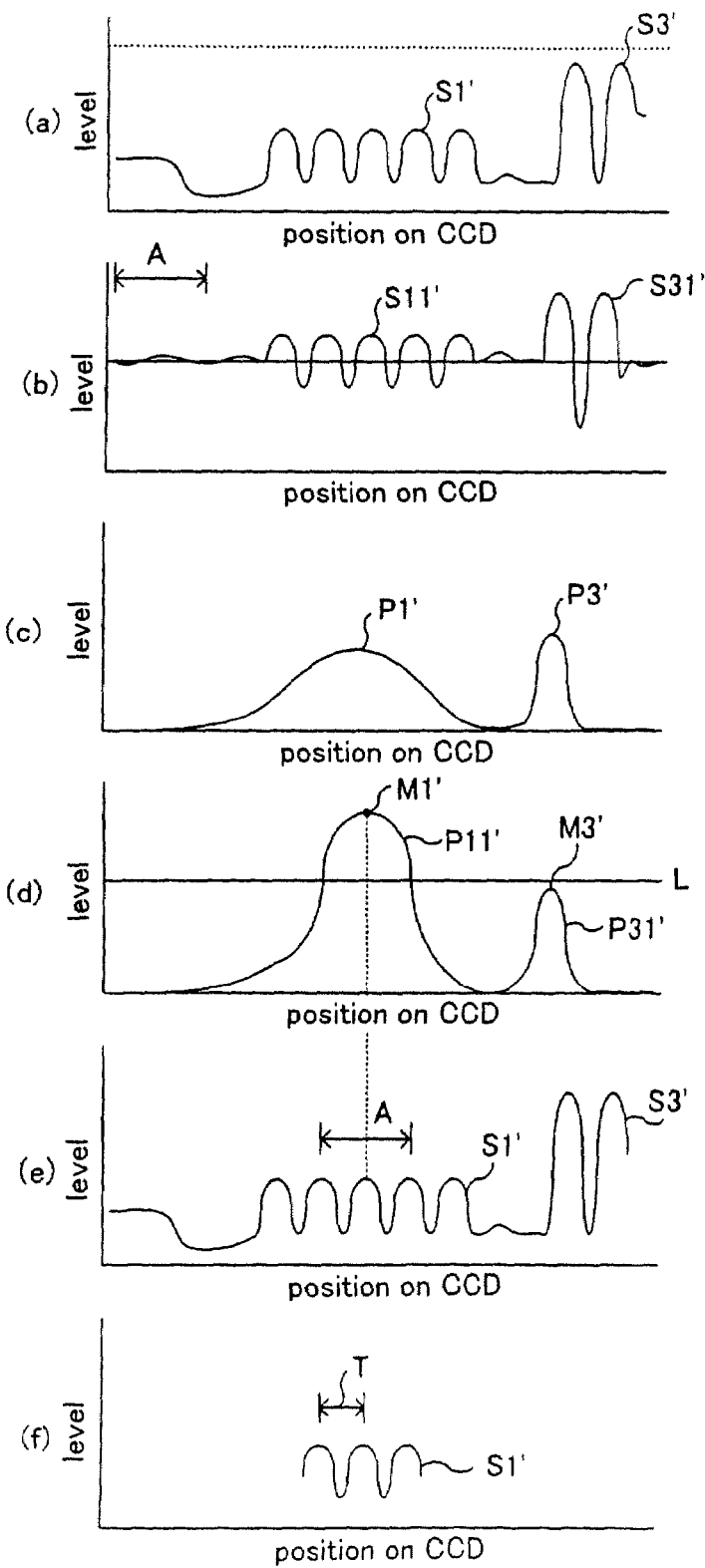
FIG. 7 is a graphical representation of functions according to a second embodiment of the invention, showing waveforms when a background object is brighter than the staff with the focusing lens positioned at its focusing position.

If an object brighter than the staff 1 exists in the background, there will appear, in the course of moving the focusing lens 21b, more than one signals such as S1' and S3' in the signal outputted from the line sensor 24, as shown in FIG. 7 (a), in association with the dark-and-bright pattern of the staff 1. Peaks of these signals S1' and S3' represent the positions of the photoelectric transducers (CCDs). The microcomputer 3 then performs band pass filtering on the signals to extract a particular frequency component having that frequency in accord with the position of the focusing lens 21b, resulting in relevant signals S11' and S31', as shown in FIG. 7(b), in association with the equally spaced pattern of the staff 1. That is, the signals S11' and S31' are regarded as capturing the pattern of the staff 1 and hence having the same frequency, since they are extracted by the band pass filter.

Next, absolute values of pulse heights of the band-pass-filtered waveforms (including signals S11' and signal S31') are calculated, and running average processing is performed on the absolute values using a preset staff sectional area A that amounts to, for example, 70 patterns of the staff 1. This will result in a waveform (including signals P1' and P3') as shown in FIG. 7(c).

In the moving average processing, signals P1' and P3' result, of which the wavelet P3' arising from the bright background object has a larger peak level than the signal P1', so that the signal P3' will be erroneously recognized as representing the pattern of the staff.

Figure 8:
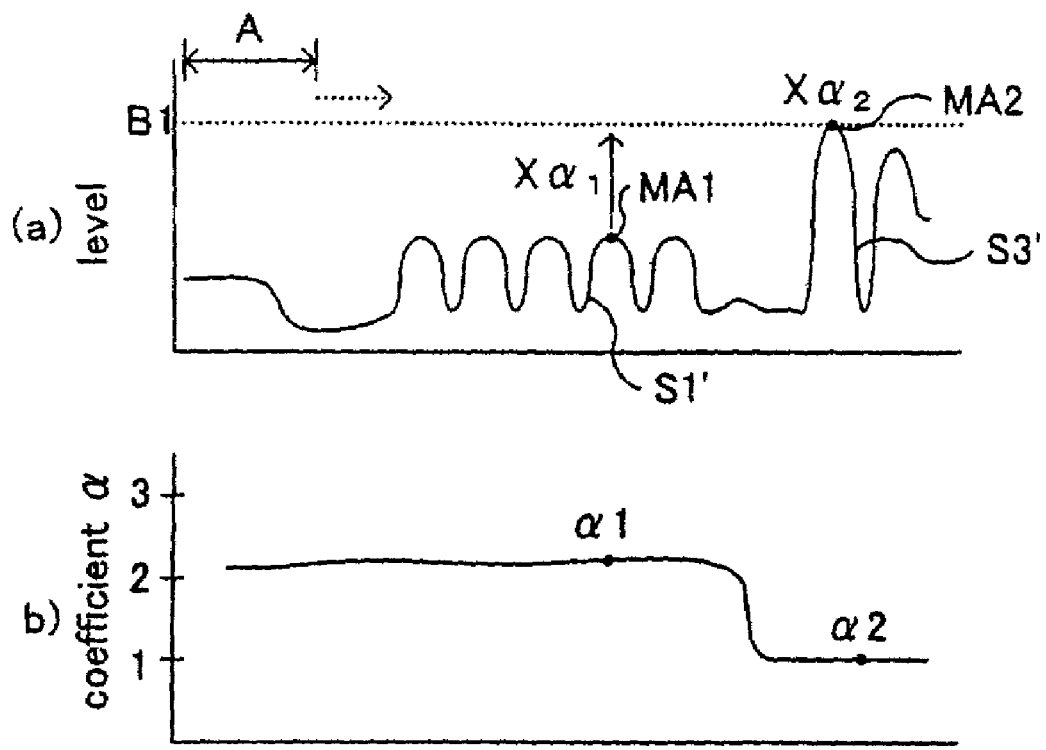
FIG. 8 is a graphical representation of light intensity correction coefficient multiplication processing of the invention.

In this embodiment, therefore, light intensity correction coefficient multiplication processing is imposed on the signals P1' and P3' obtained in the moving average processing, as described in detail below. For example, as seen in FIG. 8(a), for each of the output signals of the respective photoelectric transducers of the line sensor 24, the maximum light intensity in a staff sectional area A is compared with the maximum light intensity B1 of the entire light intensity. Specifically, in the example shown, a light intensity correction coefficient $\alpha 1$ for the signal S1' is computed based on the difference between the maximum value (maximum light intensity) MA1 within the staff sectional area A associated with the signal S1' and the maximum value (maximum light intensity) B1 in the entire pixel region. Similarly, a light intensity correction coefficient a2 for the signal S3' is computed based on the difference between the maximum light intensity MA2 within the staff sectional area A associated with the signal S3' and the maximum light intensity B1. In this instance, the maximum value MA1 of the electric signal is about ½ the maximum value B1, so that the light intensity correction coefficient $\alpha 1$ is set to about 2, as shown in FIG. 8(b). On the other hand, the light intensity correction coefficient $\alpha 2$ is set to 1, since the maximum value MA2 equals the maximum value B1. Next, following the moving average processing, the moving average shown in FIG. 7(c) is corrected using the light intensity correction coefficients $\alpha 1$ and $\alpha 2$ thus obtained. In this instance, the level of the signal P1 is multiplied by the light intensity correction coefficients $\alpha 1$ while the level of the signal P2 is multiplied by the light intensity correction coefficients $\alpha 2$. As a result of this processing, these signals P1' and P3' are corrected in signals P11' and P31', respectively, as shown in FIG. 7(d). In the example shown, the maximum value M1' of the signal P11' will be larger than the maximum value M3' of the signal P31', since the light intensity correction coefficient $\alpha 1$ is larger than the coefficient $\alpha 2$ ($\alpha 1 > \alpha 2$).

Then, a decision is made as to whether each of the maximum values of the signal corrected by the light intensity correction coefficient multiplication processing exceeds the threshold level L. In the example shown herein, the maximum value M1' of the signal P11' exceeds the threshold level L, so that it is determined that the focusing lens 21b is positioned at a substantial focusing position that corresponds to the photoelectric transducer (pixel) giving the maximum value M1', and that the signal S1' associated with the signal P11' is the signal capturing the staff 1. As the maximum value M1' of the signal P11' exceeds the threshold level L, the staff sectional area A is set in the output signal of the line sensor 24 such that the staff sectional area A has the same width as a region of photoelectric transducers (pixels) centered at the photoelectric transducer giving the maximum value M1', as shown in FIG. 7(e).

Next, the distance from the telescope 20 to the staff 1 is calculated from the period of cycle T (peak-to-peak interval) of the component signal (wavelet) S1' in the relevant gauge sectional area as shown in FIG. 7(f), on the ground that the period T corresponds to the pitch of the pattern of the staff. The focusing lens 21b can be moved to, and positioned at, the position as determined by the distance thus calculated.

In the embodiment shown herein, the invention employs: band pass filtering performed on the electric signal outputted from the line sensor 24 to extract a particular frequency component;

moving average processing performed on the averages calculated for the frequency component to obtain a relevant waveform; and light intensity correction factor multiplication processing performed on the waveform (results of the moving average processing) to obtain a corrected waveform having a maximum value that exceeds a given threshold level; and a decision that the focusing lens 21b is positioned at a substantial focusing position when the maximum value of the corrected waveform (result of the light intensity correction factor multiplication processing) exceeds a given threshold level, thereby enabling quicker and more accurate detection of the focusing lens 21b being at the focusing position even when a bright object exists in the background.

In this case, in addition to the functions implementing the above-described distance calculating means and frequency detection means, the microcomputer 3 has further functions implementing:

means for calculating the absolute values of the pulse heights of particular frequency components extracted by the frequency detection means and for performing moving average processing on the calculated absolute values using a preset staff sectional area A;

light intensity correction coefficient calculation means for calculating light intensity correction coefficients on the basis of the difference between the maximum value within the staff sectional area used in the moving average processing means and the maximum light intensity obtained from the output signals of the multiple photoelectric transducers;

light intensity correction coefficient multiplication means for multiplying the result of the moving average processing by the respective light intensity correction coefficients;

decision means for making a decision whether each of the maximum values of the products obtained in the light intensity correction coefficient multiplication exceeds a given threshold or not;

staff sectional area setting means for setting a staff sectional area in the output signal of the line sensor 24 such that the staff sectional area has the same width as a region of photoelectric transducers centered at the transducer giving the maximum value when an affirmative answer is obtained in the decision; and calculation means for calculating the distance from the telescope 20 to the staff 1 based on the period of cycle T of the output signal of the line sensor 24 within the staff sectional area by regarding the period of cycle as the pitch of the pattern of the staff.

Figure 9:
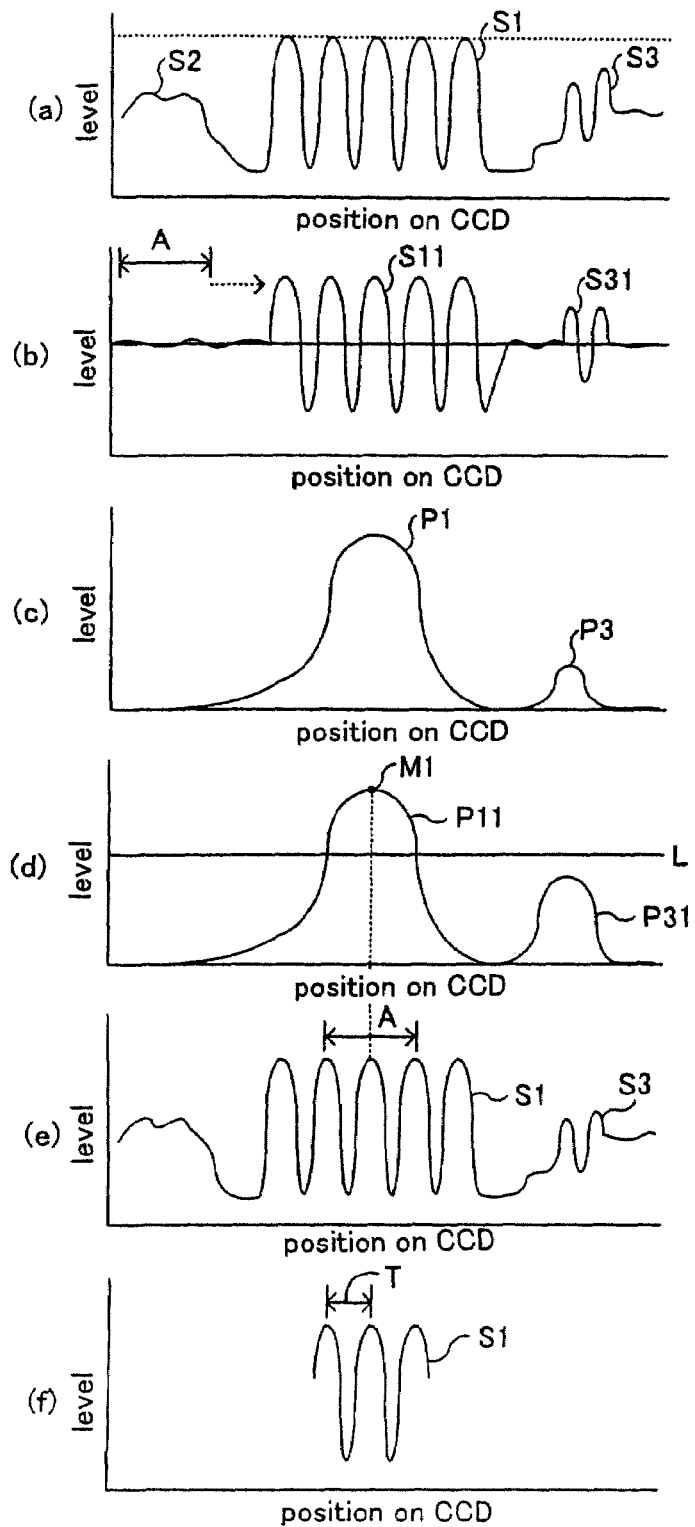
FIG. 9 is another graphical representation of the functions according to a second embodiment of the invention, showing waveforms when the staff is brighter than the background with the focusing lens positioned at its focusing position.
Figure 10:
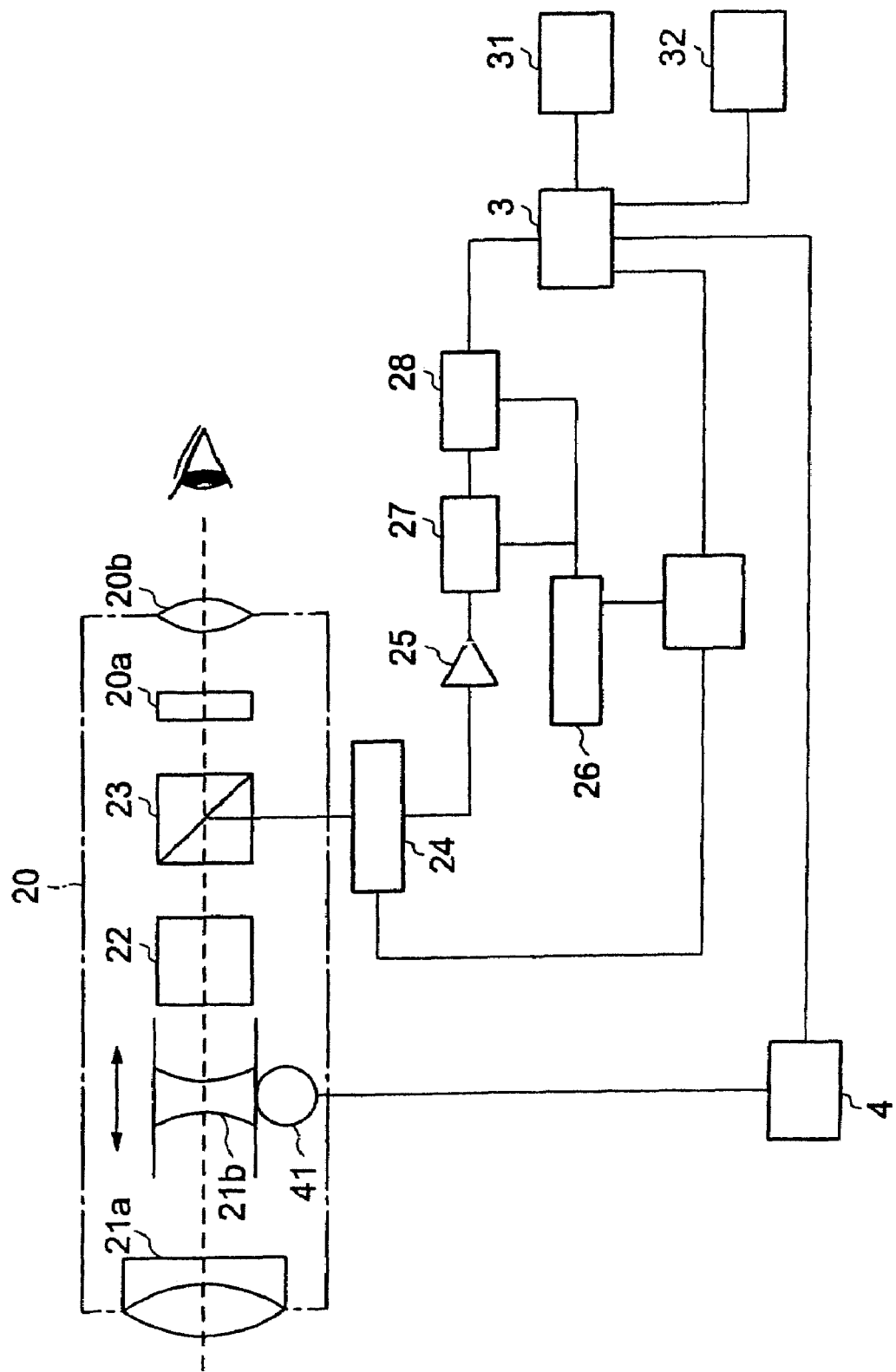
FIG. 10 is a block diagram representation of a conventional auto focusing mechanism.
Figure 11:
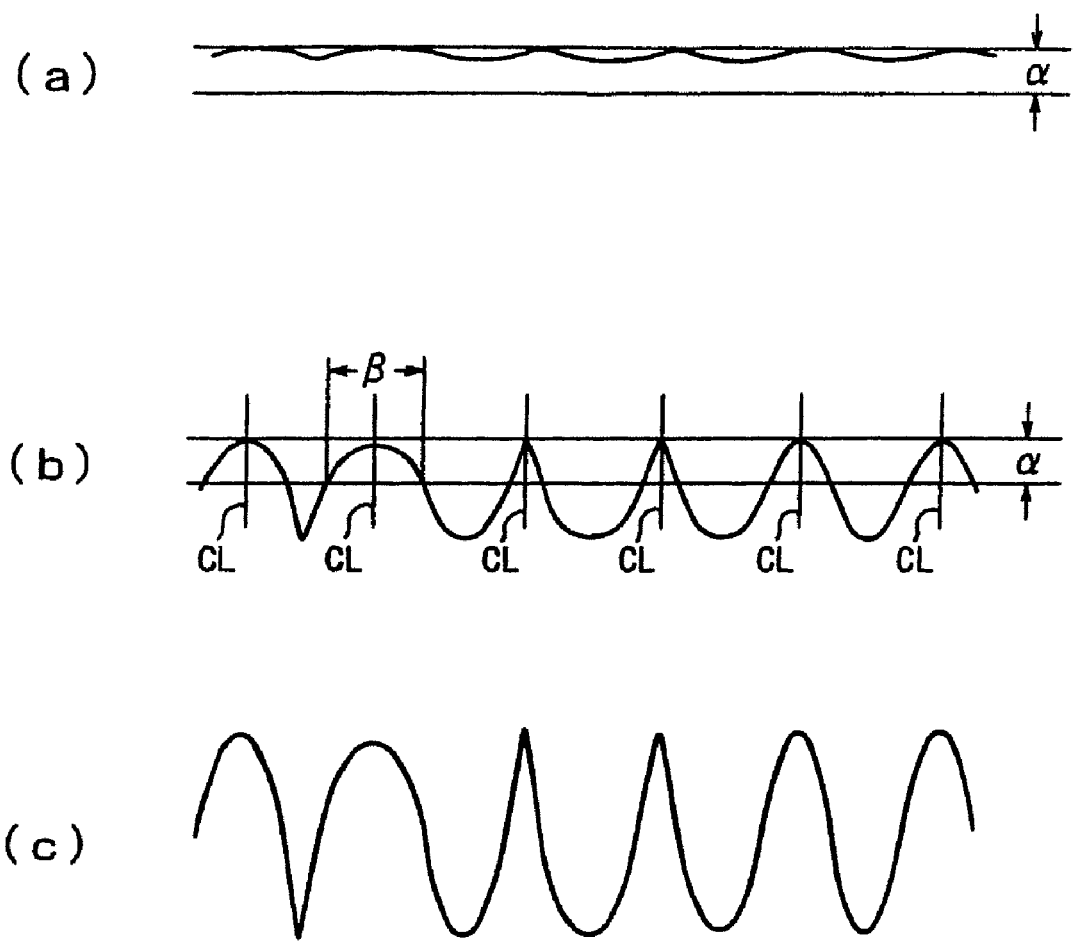
FIG. 11 shows waveforms illustrating operation of the conventional auto focusing mechanism.

On the other hand, if the above-described processing is performed, including light intensity correction coefficient multiplication processing, when the staff 1 is placed in a brighter environment than its background, waveforms as shown in FIG. 9(a)-(f) will result. In this case, although the difference between the levels of the signals P1 and P3 is reduced after they are subjected to the light intensity correction coefficient multiplication processing, the maximum value of the signal P31 will never exceed that of the signal P11, since the signal S31 has less continuity than the signal S11. Therefore, automatic positioning of the focusing lens 21b can be attained by:

(1) regarding the focusing lens 21b positioned at a substantial focusing position, provided that the maximum value M1 of the signal P11 exceeds the threshold level L;

(2) setting a staff sectional area A such that the area A has the same width as a range of pixels centered at the pixel that gives the maximum value M1 (FIG. 9(e));

(3) regarding the period of cycle T (peak-to-peak distance) of the component signal (wavelet S1) within the staff sectional area to correspond to the pitch of the pattern of the staff 1;

(4) calculating the distance from the telescope 20 to the staff 1 based on the pitch of the output signal of the line sensor 24 within the staff sectional area;

(5) calculating the distance from the telescope 20 to the staff 1 based on this pitch; and (6) moving the focusing lens 21b to the focusing position calculated from the distance.

DESCRIPTION OF THE REFERENCE NUMERALS 1. staff
2. electronic level
3. microcomputer
4. drive circuit
5. position sensor
20. telescope
20a. focusing plate
20b. eyepiece
21a. objective lens
21b. focusing lens
22. automatic compensation mechanism
23. beam splitter
24. line sensor
41. motor

The invention claimed is:

1. An auto focusing mechanism for use with a surveying instrument equipped with a telescope having a collimating optical system that includes, between an objective lens and an eyepiece thereof, a focusing plate and a focusing lens for forming on said focusing plate an image of a staff serving as a targeted collimating object, said staff having thereon a multiple pattern marked at equal intervals, said auto focusing mechanism adapted to automatically focus said telescope on said staff, said auto focusing mechanism comprising:

drive means for moving said focusing lens in the direction of the optical axis of said collimating optical system;

position detection means for detecting the position of said focusing lens in said collimating optical system;

photoelectric conversion means for converting into an electric signal the image formed on said focusing plate;

frequency detection means for detecting the frequencies of said electric signal outputted from said photoelectric conversion means;

distance calculation means for calculating the distance from said telescope to said staff based on the output signal received from said photoelectric conversion means, said distance calculation means adapted to monitor the position of said focusing lens detected by said position detection means and the frequencies detected by said frequency detection means to thereby determine said distance when a particular frequency for a focusing position is detected by said frequency detection means during a process of varying the position of said focusing lens; and drive control means for controlling said drive means to position said focusing lens at a focusing position based on the distance calculated by said distance calculation means and the position detected by said position detection means, wherein said frequency detection means extracts, from the electric signal outputted from said photoelectric conversion means, only a particular frequency component that is presumably detectable for the dark-and-bright pattern of said staff when said focusing lens is positioned at the focusing position, and wherein said distance calculation means includes:

moving average processing means for calculating the absolute values of pulse heights of said particular frequency components extracted by said frequency detection means, and performing moving average processing on the absolute values of pulses in a given preset staff sectional area;

decision means for making a decision as to whether the maximum value of the moving average obtained by said moving average processing exceeds a given threshold level or not;

staff area setting means for setting a staff sectional area in the output signal of said photoelectric conversion means when an affirmative decision is obtained in said decision, said staff sectional area having the same width as a region of photoelectric transducers centered at the transducer giving said maximum value; and calculation means for calculating the distance from said telescope to said staff based on the period of said output signal of said photoelectric conversion means within said staff sectional area by regarding the period of cycle as the pitch of the pattern of said staff.

2. An auto focusing mechanism for use with a surveying instrument equipped with a telescope having a collimating optical system that includes, between an objective lens and an eyepiece thereof, a focusing plate and a focusing lens for forming on said focusing plate an image of a staff serving as a targeted collimating object, said staff having thereon a multiple pattern marked at equal intervals, said auto focusing mechanism adapted to automatically focus said telescope on said staff, said auto focusing mechanism comprising:

drive means for moving said focusing lens in the direction of the optical axis of said collimating optical system;

position detection means for detecting the position of said focusing lens in said collimating optical system;

photoelectric conversion means for converting into an electric signal the image formed on said focusing plate;

frequency detection means for detecting the frequencies of said electric signal outputted from said photoelectric conversion means;

distance calculation means for calculating the distance from said telescope to said staff based on the output signal received from said photoelectric conversion means, said distance calculation means adapted to monitor the position of said focusing lens detected by said position detection means and the frequencies detected by said frequency detection means to thereby determine said distance when a particular frequency for a focusing position is detected by said frequency detection means during a process of varying the position of said focusing lens; and drive control means for controlling said drive means to position said focusing lens at a focusing position based on the distance calculated by said distance calculation means and the position detected by said position detection means, wherein said frequency detection means extracts, from the electric signal outputted from said photoelectric conversion means, only a particular frequency component that is presumably detectable for the dark-and-bright pattern of said staff when said focusing lens is positioned at the focusing position, and wherein said photoelectric conversion means includes multiple photoelectric transducers, and said distance calculation means includes:

moving average processing means for calculating the absolute values of pulse heights of said particular frequency components extracted by said frequency detection means, and performing moving average processing on the absolute values of pulses within a given preset staff sectional area;

light intensity correction coefficient calculation means for calculating a light intensity correction coefficient based on the difference between the maximum light intensity obtained from the level of the electric signal within the staff sectional areas used in the moving average processing and the maximum light intensity obtained from the output signals of said multiple photoelectric transducers;

light intensity correction coefficient multiplication means for multiplying the moving average obtained by said light intensity correction coefficient calculation means;

decision means for making a decision whether the maximum value of the products obtained by said light intensity correction coefficient multiplication means exceeds a given threshold or not;

staff area setting means for setting a staff sectional area in association with said output signal of said photoelectric conversion means when an affirmative decision is obtained in said decision, such that said staff sectional area has the same width as a region of photoelectric transducers centered at the transducer giving said maximum value; and calculation means for calculating the distance from said telescope to said staff based on said period of the output signal of said photoelectric conversion means within said staff sectional area by regarding said period of cycle as the pitch of the pattern of said staff.

* * * * *